Dec. 9, 1958            A. J. TIGGES           2,863,723
METHOD OF RECOVERING HEAT AND SULPHUR COMPOUNDS
FROM HOT GASEOUS PRODUCTS OF COMBUSTION
Original Filed Dec. 30, 1949
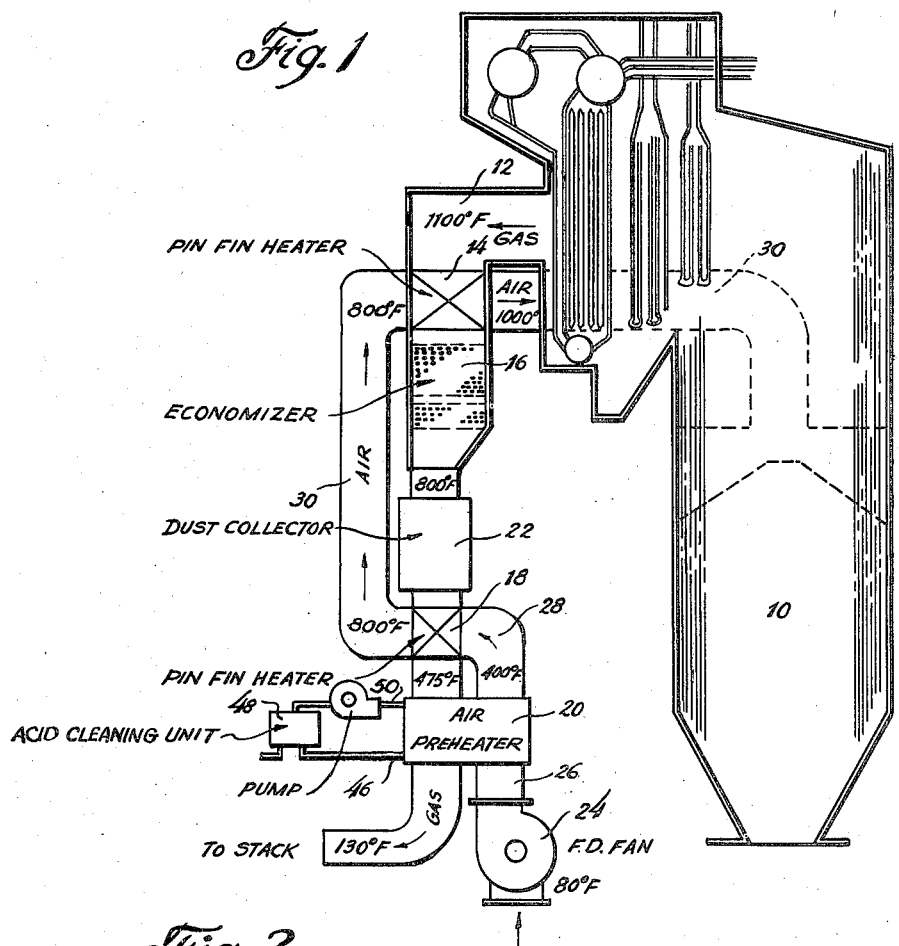
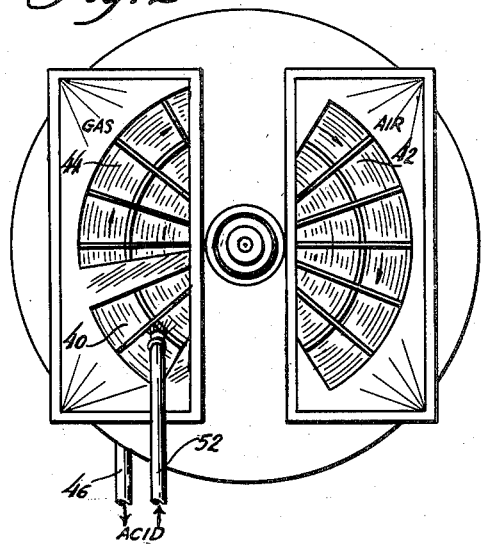
INVENTOR.
Alexander J. Tigges
BY
ATTORNEY

United States Patent Office 2,863,723
Patented Dec. 9, 1958

2,863,723

METHOD OF RECOVERING HEAT AND SULFUR COMPOUNDS FROM HOT GASEOUS PRODUCTS OF COMBUSTION

Alexander J. Tigges, New York, N. Y., assignor, by mesne assignments, to The Air Preheater Corporation, New York, N. Y., a corporation of New York Continuation of application Serial No. 135,869, December 30, 1949. This application October 21, 1954, Serial No. 463,654

3 Claims. (Cl. 23—168)

The present invention relates to heat exchange in power plants and particularly to improvements in systems of this type that utilize rotary regenerative air preheaters.

In modern power plants the high cost of coal and other fuels leads to constant striving to attain the maximum efficiency by absorbing as much heat as is practicable from the hot gases produced in the process of combustion. This is customarily accomplished through the use of economizers and air preheaters in addition to the necessary steam generating and superheating elements. In rotary regenerative air preheaters to which the invention is directed, a rotor conventionally carries spaced metallic plates which when positioned in the gas passage absorbs heat that upon movement of the plates into the air passage is imparted to air utilized in combustion of fuel or the like. As a consequence of efforts to achieve high heat recovery, the gases when reaching the cold end of a rotary air preheater attain a temperature at or close to their dew point and, as a result, moisture is condensed upon the heat transfer surface at the "cold end" of the preheater. This subjects the plate surfaces to attack by the gases and their constituents, including solids deposited on the surface in combination with such corrosive constituents of the gases as are absorbed by these deposits.

The present invention contemplates a heat recovery plant including a rotary regenerative air preheater in which one or more other air preheater or equivalent heat exchange surface are employed to attain even greater heat recovery from the gases than has heretofore been considered feasible. To offset the attendant disadvantage that such high heat recovery in a power plant will result in deliberate lowering of the temperature of the exit gases to a value below their dew point, it is proposed to continually wash the heat exchange material in the air preheater rotor during its operation with a concentrated solution of acid, such as sulphuric acid, so as to maintain the surfaces in a wet condition and carry off therefrom in the acid the corrosive constituents of and the deposits carried in the gases.

In the drawing, Figure 1 is a diagrammatic view of a heat recovering plant having a boiler, economizer and other heat exchange units including a rotary regenerative air preheater which has acid washed surfaces in accordance with the present invention.

Figure 2 is a diagrammatic view illustrating the specially apertured sector or end plates provided in the air preheater in carrying out the present invention.

In the heat recovery plant illustrated in Figure 1 the gases of combustion produced by burning fuel in the furnace 10 after imparting heat to the usual steam generating and superheating elements pass into the offtake 12 in which are located a series of auxiliary heat recovery devices installed for the purpose of obtaining a high rate of heat recovery. These include a recuperative heater 14, which may be of the plate type, followed by an economizer or water heater 16, a second recuperative air heater 18 and a rotary regenerative air preheater 20, with a dust collector 22 located in the offtake in advance of the regenerative preheater 20. Air is supplied to the several air preheaters by a forced draft fan 24 connected with the duct 26, 28, 30 that interconnects the various air preheating devices mentioned above. The air heated to its maximum temperature is discharged through the duct 30 from the recuperative heater 14 for use in the combustion of fuel in the furnace 10 or for other purposes.

The regenerative air preheater 20 is of a construction so well known that it is deemed unnecessary to describe it beyond stating again that it has a motor-driven rotor carrying spaced metal plates which when positioned in the gas passage absorb heat that upon movement of the plates into the air passage is imparted to the air supplied through duct 26. As mentioned above, the cooling of the plates at the air inlet and gas outlet, or "cold" end, of the preheater results in their being reduced to a temperature which even in conventional plants sometimes approaches the dew point of the gases so that moisture is condensed upon the plates at the cold end of the preheater 20. In accordance with the present invention, this ordinarily disadvantageous condition is deliberately produced by providing so much heat absorbing surface in the path of the gases between the furnace 10 and the regenerative air preheater 20 that the high heat recovery attained results in the gases being cooled to so low a temperature that the heat transfer plates or other surface in the rotor are at a temperature well below the dew point of the gases. To counteract what would ordinarily be a deleterious condition producing condensation from the gases and resulting in deterioration of the rotor plates the latter are, while in operation, continuously wetted with sulphuric acid of approximately 70% concentration, which concentration it will be recognized is not so dilute as to eat away the plates. This wetting action takes place in a special section 40 provided between the air passage 42 and the gas passage 44 of the regenerative preheater as diagrammatically indicated in Figure 2.

In cooling the waste gases from the boiler to the temperatures indicated by way of example in Figure 1, the $SO_3$ gas in the products of combustion combines with the condensed water vapors produced as a result of lowering the temperature of the gases below the dew point and forms sulphuric acid. This acid is then collected in a trough and removed through a pipe 46 from the bottom of the preheater to be passed through an acid cleaning unit 48 from which the acid is again passed through a pipe 50 to be sprayed upon the surfaces of the plates by a nozzle pipe 52 extending into the special section 40 at a point opposite the plate surfaces. Thus, by deliberately cooling the preheater surface below the dew point of the gases the water vapor condensed therefrom unites with the acid constituents to form sulphuric acid which combines with the quantity supplied to wet the surfaces. In addition to the commercial value of the acid recovered from the gases, the removal of these constituents lessens the pollution of the atmosphere by the acidic gases and also by the solids carried away with them which would otherwise escape from the stack. This is particularly so where a dust collector 22 is employed ahead of the regenerative air preheater so as to remove the coarser particles before the entry of the gases from the preheater with the result that the finer particles may be carried from the surfaces by the acid which wets them.

The system described above permits a considerable increase in the efficiency of heat recovery plants. This is accomplished without rendering the air preheater surfaces more liable to corrosion and deterioration, as would be expected, and is brought about without the expense of providing special ducts for by-passing or recirculation of air or the provision of special soot-blowing equipment, as has heretofore been deemed advantageous.

While the system described above is particularly advantageous in heat recovery plants embodying a rotary regenerative air preheater, beneficial results are likewise attained in washing with concentrated acid the gas contacted surfaces of recuperative, plate or tubular air preheaters.

This is a continuation of the application filed in my name under Serial No. 135,869 on December 30, 1949, now abandoned.

What I claim is:

1. The method of recovering heat and sulphur compounds from the products of combustion of fuels containing corrosive constituents producing gases including sulphur compounds such as $SO_2$ which comprises; absorbing heat from said gases by heat exchange surfaces of a material normally attacked by corrosive substances so as to reduce the temperature of the gases to a point considerably below their dewpoint and thereby cause condensation on said surfaces of moisture from said gases in the presence of said sulphur compounds; washing said surfaces with a noncorrosive solution of sulphuric acid of a concentration of approximately 70% in order to carry off said condensed moisture and $SO_2$; recovering said acid and condensed moisture; purifying the acid wash liquid to obtain acid for reuse; and recycling part of the reclaimed acid to wash said surfaces.

2. The method of recovering heat and sulphur compounds from hot gaseous products of combustion containing corrosive constituents such as $SO_3$ which comprises; absorbing heat from said gaseous products of combustion on metallic heat exchange surfaces at temperatures considerably below the dewpoint of the gaseous products of combustion thereby exposing said metallic surfaces to the effect of corrosive constituents of and deposits carried by the gaseous products of combustion and to condensation of acid vapors therefrom; continually spraying the entire gas contacted surfaces of said heat exchange surface with a solution of sulphuric acid of a concentration of approximately 70% so as to avoid corrosion while carrying off said corrosive constituents of and deposits in said gases as well as said condensed acid vapors; and recovering said acid and condensed acid vapors for further utilization.

3. An air preheating installation for imparting heat from a stream of hot dust laden gases to a stream of air flowing in counterflow comprising; a pair of unitary air heaters separately mounted in spaced relation; an air duct and a gas duct connecting the air and the gas passages of said heaters in series relation for the flow of streams of gas and air therethrough; and a dust collector interposed between the two heaters and so connected to the gas duct between the two heaters as to direct the entire stream of gas received from one air heater of said pair through the other heater of said pair.

References Cited in the file of this patent

UNITED STATES PATENTS

| | | |
|---|---|---|
| 1,456,065 | Lamoreux | May 22, 1923 |
| 1,608,006 | Shapleigh | Nov. 23, 1926 |
| 2,071,598 | Von Girsewald et al. | Feb. 23, 1937 |
| 2,199,691 | Carter | May 7, 1940 |
| 2,236,358 | Allardice | Mar. 25, 1941 |
| 2,236,635 | Young | Apr. 1, 1941 |
| 2,363,870 | Karlsson et al. | Nov. 28, 1944 |
| 2,539,519 | Melendy | Jan. 30, 1951 |
| 2,549,583 | Eckersley | Apr. 17, 1951 |

FOREIGN PATENTS

| | | |
|---|---|---|
| 266,603 | Germany | Oct. 28, 1913 |